US012409584B2

United States Patent
Chigot et al.

(10) Patent No.: US 12,409,584 B2
(45) Date of Patent: Sep. 9, 2025

(54) METHOD FOR MANUFACTURING ACOUSTICAL ELEMENTS

(71) Applicant: SAINT-GOBAIN ECOPHON AB, Hyllinge (SE)

(72) Inventors: Pierre Chigot, Helsingborg (SE); Emma Arvidsson, Helsingborg (SE); Erling Nilsson, Lund (SE); Tommy Mansson, Angelholm (SE)

(73) Assignee: SAINT-GOBAIN ECOPHON AB, Hyllinge (SE)

(*) Notice: Subject to any disclaimer, the term of this patent is extended or adjusted under 35 U.S.C. 154(b) by 296 days.

(21) Appl. No.: 18/001,963

(22) PCT Filed: Jul. 2, 2021

(86) PCT No.: PCT/EP2021/068350
§ 371 (c)(1),
(2) Date: Dec. 15, 2022

(87) PCT Pub. No.: WO2022/003163
PCT Pub. Date: Jan. 6, 2022

(65) Prior Publication Data
US 2023/0226725 A1 Jul. 20, 2023

(30) Foreign Application Priority Data

Jul. 2, 2020 (EP) .................................. 20183620

(51) Int. Cl.
*B29C 43/00* (2006.01)
*B29C 43/24* (2006.01)
(Continued)

(52) U.S. Cl.
CPC ............ *B29C 43/003* (2013.01); *B29C 43/24* (2013.01); *B29K 2105/25* (2013.01);
(Continued)

(58) Field of Classification Search
CPC ... B29C 43/003; B29C 43/24; B29K 2105/25; B29L 2031/104; E04B 1/86; E04B 9/04;
(Continued)

(56) References Cited

U.S. PATENT DOCUMENTS 1,769,519 A * 7/1930 King ...................... G05B 11/44
181/294
4,642,951 A * 2/1987 Mortimer ................ B29C 51/00
181/290
(Continued)

FOREIGN PATENT DOCUMENTS

EP 2 262 960 A1 12/2010

OTHER PUBLICATIONS

WO 9729254 (Year: 1997).*
(Continued)

*Primary Examiner* — Xiao S Zhao
*Assistant Examiner* — Guy F Mongelli
(74) *Attorney, Agent, or Firm* — Oblon, McClelland, Maier & Neustadt, L.L.P.

(57) ABSTRACT

A method for manufacturing acoustical elements, includes providing a first fibre component in a form of mineral wool and a second fibre component in a form of bicomponent fibres having a core with a thermoplastic outer layer, mixing the first fibre component and the second fibre component, for provision of a mixture, shaping the mixture into single layered tile shaped elements whereby the mixture is compressed with a compression ratio to a compressed state, and fixating the single layered tile shaped elements in the compressed state for obtaining the acoustical elements.

11 Claims, 3 Drawing Sheets

(51) Int. Cl.
   *B29K 105/00* (2006.01)
   *B29L 31/10* (2006.01)
   *E04B 1/86* (2006.01)
   *E04B 9/04* (2006.01)
(52) U.S. Cl.
   CPC ........... *B29L 2031/104* (2013.01); *E04B 1/86* (2013.01); *E04B 9/04* (2013.01)
(58) Field of Classification Search
   CPC .. E04B 2001/7687; E04B 1/99; E04B 9/0457; E04B 9/0464; E04B 2001/746; E04B 9/001; E04B 2001/8461; E04B 2001/8485; G10K 11/162; G10K 11/172; D21H 13/40
   See application file for complete search history.

(56) References Cited

U.S. PATENT DOCUMENTS

| | | | |
|---|---|---|---|
| 5,817,992 A | 10/1998 | D'Antonio | |
| 5,923,002 A | 7/1999 | McGrath et al. | |
| 2002/0096278 A1* | 7/2002 | Foster | E04B 9/045 162/143 |
| 2003/0099850 A1* | 5/2003 | Belmares | C08L 61/06 525/397 |
| 2003/0124330 A1* | 7/2003 | Belmares | C09D 7/61 428/295.1 |
| 2004/0050140 A1* | 3/2004 | Palmer | B06B 3/00 73/599 |
| 2005/0281999 A1* | 12/2005 | Hofmann | B32B 5/18 428/319.3 |
| 2007/0001334 A1* | 1/2007 | Pattabhi | B28B 1/44 264/87 |
| 2007/0056705 A1* | 3/2007 | Baig | D21H 13/40 162/135 |
| 2007/0102237 A1 | 5/2007 | Baig | |
| 2009/0126886 A1* | 5/2009 | Englert | C03C 25/30 162/151 |
| 2009/0253323 A1* | 10/2009 | Mueller | B32B 5/08 524/425 |
| 2010/0238766 A1* | 9/2010 | Penny | G10K 11/162 367/176 |
| 2010/0320029 A1* | 12/2010 | Cao | C04B 30/02 264/234 |
| 2011/0024955 A1* | 2/2011 | Yang | C04B 38/0032 264/628 |
| 2011/0291316 A1* | 12/2011 | Lempfer | B27N 3/002 264/119 |
| 2011/0293892 A1* | 12/2011 | Ogawa | D21H 27/40 428/172 |
| 2012/0285767 A1* | 11/2012 | Meyer | E04B 1/8209 181/290 |
| 2014/0137495 A1* | 5/2014 | Ariza | E04B 2/828 52/238.1 |
| 2017/0138042 A1* | 5/2017 | Hong | E04F 15/203 |
| 2018/0079691 A1* | 3/2018 | Donelan | C04B 30/02 |
| 2018/0162107 A1* | 6/2018 | Xu | B32B 27/286 |
| 2019/0062215 A1* | 2/2019 | Lu | D21H 19/34 |
| 2020/0001568 A1* | 1/2020 | Wei | A47B 96/206 |
| 2020/0002941 A1 | 1/2020 | Oleske et al. | |
| 2020/0338867 A1* | 10/2020 | Luttwak | B32B 21/02 |

OTHER PUBLICATIONS

International Search Report issued Oct. 6, 2021 in PCT/EP2021/068350, filed on Jul. 2, 2021, 4 pages.

Cerkez, I. et al., "Airlaid nonwoven panels for use as structural thermal insulation", The Journal of the Textile Institute, vol. 109, No. 1, pp. 17-23, 2018, XP055757338.

* cited by examiner

METHOD FOR MANUFACTURING ACOUSTICAL ELEMENTS

FIELD OF THE INVENTION

The present invention relates to acoustical elements, typically in the shape of ceiling tiles or wall panels. More specifically, the present invention relates to a method for manufacturing acoustical elements and to a suspended ceiling system comprising ceiling tiles in the form of acoustical elements manufactured according to the method.

BACKGROUND ART

Ceiling tiles in suspended ceiling systems serve several purposes. They should provide an aesthetically pleasing interior ceiling that allows covering of building equipment such as ventilation, ducts, and wiring. Some ceiling tiles form functional parts of the ventilation, for instance by being provided with nozzles for direct ventilation or by allowing air to be ventilated through or around the ceiling tiles to form diffuse ventilation.

In many cases, ceiling tiles are used to provide improved acoustics to the room in which they are mounted and may thus form acoustical elements. Such acoustical elements may also be mounted to the walls of a room. Many variations of the properties of acoustical elements are available, for instance the shape, density and air opacity may all be altered to achieve different acoustic properties. Different acoustical elements are thus available for achieving an acoustic environment in the room which suits the intended use. However, even if many different types of acoustical elements are available, it is generally difficult and time consuming to achieve combinations of ceiling tiles that provides the desired acoustics for each room.

Moreover, manufacturers of acoustical elements such as ceiling tiles generally strive towards reducing the environmental impact of their products. It is thus desired to find a way to provide acoustical elements that requires less resources than prior art acoustical elements.

SUMMARY OF THE INVENTION

In view of that stated above, the object of the teachings herein is to provide a method for manufacturing acoustical elements that alleviates some of the problems with prior art. It is also an object to provide a suspended ceiling system comprising acoustical elements manufactured according to the method.

To achieve at least one of the above objects and also other objects that will be evident from the following description, there is provided in a first aspect a method for manufacturing acoustical elements. The method comprises:
providing a first fibre component in the form of mineral wool and a second fibre component in the form of bicomponent fibres having a core with a thermoplastic outer layer,
mixing the first fibre component and the second fibre component, for provision of a mixture,
shaping the mixture into tile single layered shaped elements whereby the mixture is compressed with a compression ratio to a compressed state, and
fixating the single layered tile shaped elements in the compressed state for obtaining the acoustical elements,
wherein fixating the single layered tile shaped elements comprises heating the single layered tile shaped elements in the compressed state for melting the thermoplastic outer layer of the bicomponent fibres, whereby the second fibre component is activated for fixating the single layered tile shaped elements in the compressed state. Mixing the first fibre component and the second fibre component and shaping the mixture comprises controlling a mixing ratio of the first fibre component in relation to the second fibre component and/or the compression ratio of the mixture such that a first group of the acoustical elements having a first set of acoustic properties, such as sound absorbing properties, and a second group of the acoustical elements having a second set of acoustic properties being different from the first set of acoustical properties. The first fibre component preferably comprising a recycled fibre material in the form of grinded recycled ceiling tiles. The method allows adaptation and manufacturing of different groups of acoustical elements in one process, which facilitates provision of a suspended ceiling system that is adapted to the intended use whilst reducing environmental impact by using recycled materials. The manufacturing method of the acoustical elements can thus be adapted such that each acoustical element can be provided with acoustic properties that suits its indented use and position in e.g. a suspended ceiling system.

The shaping of the mixture may comprise forming the single layered tile shaped elements in a form pressing operation, such as vacuum forming, pressure forming and/or drape forming. Form pressing permits large variations of the shape and the compression ratio in different regions of each acoustical element.

Moreover, shaping the mixture may comprise a calendaring operation, providing additional variations to the surface topography and/or compression ratio of the acoustical element.

The mixing ratio may further be controlled such that the mixing ratio for a single acoustical element is non-uniform. Consequently, each acoustical element may comprise regions with varying proportions of the first and second fibre component. Each such region will exhibit different acoustical properties, allowing each acoustical element to be adapted for its intended use.

The compression ratio may further be controlled such that the compression ratio for a single acoustical element is non-uniform. The compression ratio could be varied such that a varying density of the acoustical element between 30 and 150 $kg/m^3$ can be achieved.

Shaping the mixture may comprise forming single layered tile shaped elements with non-uniform thickness. Alternatively, the single layered tile shaped elements may be formed with a uniform thickness The method may further comprise arranging core elements in the mixture before the step of shaping of the mixture and removing the core elements from the single layered tile shaped elements after the step of fixating of the single layered tile shaped elements for formation of cavities in the acoustical elements. The acoustical properties of the acoustical element can be further adapted by the provision of the cavities, each of which may alter the air flow resistance through the acoustical element and/or resonance properties throughout the fibre structure.

The core elements may be arranged for formation of a plurality of evenly distributed cavities in each acoustical element.

The shaping of the mixture into tile shaped elements may be performed such that the single layered tile shaped elements are provided with a single curved or double curved extension.

Shaping of the mixture into single layered tile shaped elements may be performed such that the single layered tile shaped elements obtain a front surface and/or rear surface provided with a topography, i.e. the front and/or rear surface being non-planar.

The method may further comprise providing each of the acoustical elements with a surface layer forming a front and/or back layer thereof, the surface layer provides additional possible variations to acoustical properties of each acoustical elements.

The surface layer may have a non-uniform air flow resistance.

In a second aspect is a suspended ceiling system provided comprising ceiling tiles in the form of acoustical elements manufactured by the method of the first aspect. The ceiling tiles are obtained from the first and second group of acoustical elements. The suspended ceiling system may thus be adapted to suit the intended use by provision of acoustical elements according to the manufacturing method disclosed herein in one manufacturing process.

Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of said element, device, component, means, step, etc., unless explicitly stated otherwise. The steps of any method disclosed herein do not have to be performed in the exact order disclosed, unless explicitly stated.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawings, where the same reference numerals will be used for similar elements, wherein.

DESCRIPTION OF EMBODIMENTS

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled person.

Figure 1:
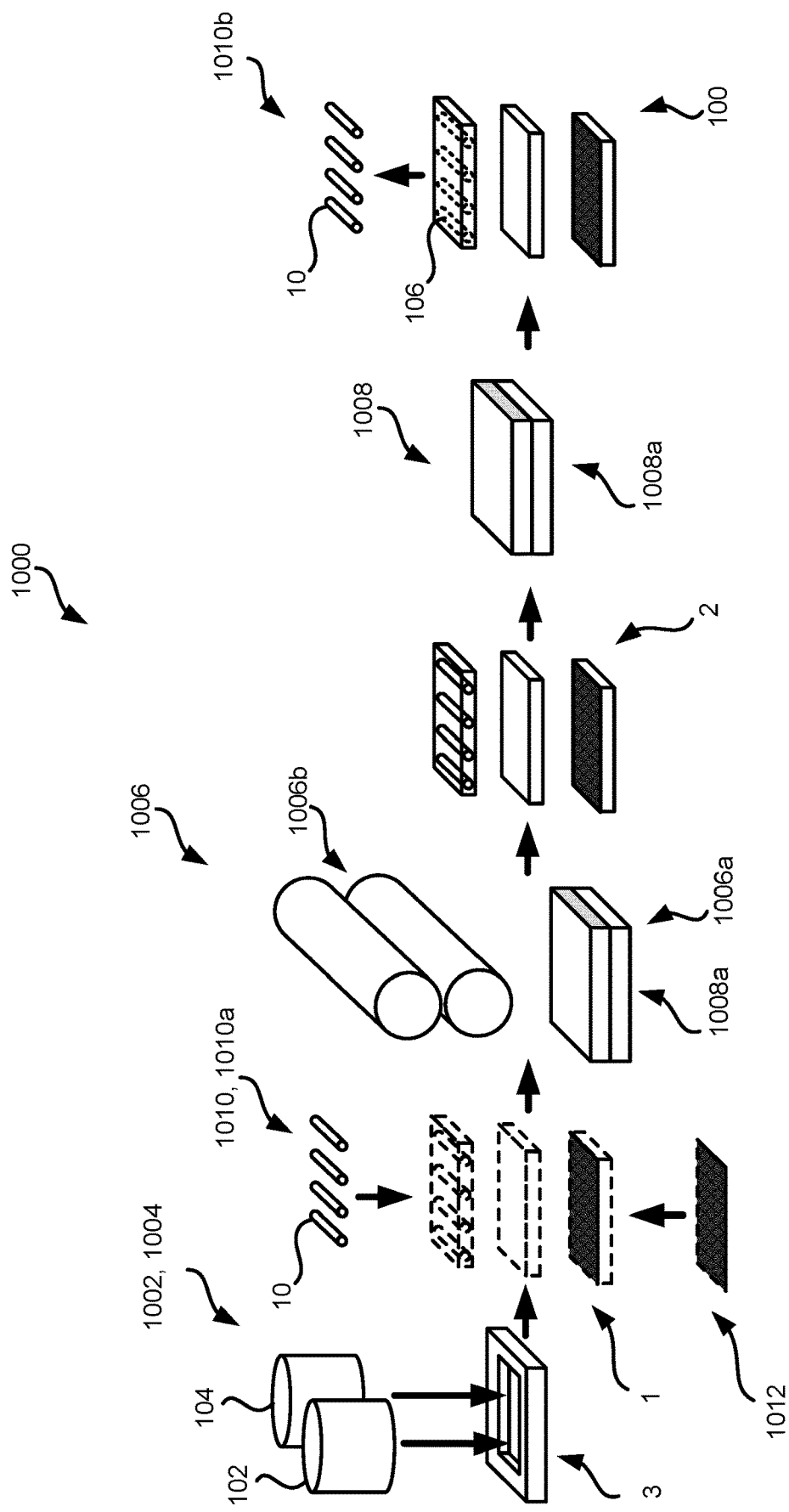
FIG. 1 discloses a schematic outline of a method for manufacturing acoustical elements.

FIG. 1 shows a schematic outline of a method 1000 for manufacturing acoustical elements 100. The acoustical elements 100 are preferably tile shaped and configured to be arranged in a suspended ceiling system 200 (shown in FIG. 9). The acoustical elements 100 are intended to provide an aesthically pleasing interior ceiling in a room in which the suspended ceiling 200 is mounted. Further, the acoustical elements 100 are intended to provide acoustic properties to the suspended ceiling system 200 that can be tailored for the desired use of the room in which the suspended ceiling system 200 is mounted. While the acoustical elements 100 in the present disclosure are described as being mounted to a suspended ceiling system, it is to be realized that the acoustical elements 100 could just as well be mounted to a wall in a room as wall panels.

Moreover, the method 1000 disclosed herein provides a way of utilizing recycled fibre material from older ceiling tiles.

The method 1000 comprises providing 1002 a first fibre component 102 in the form of mineral wool and a second fibre component 104 in the form of bicomponent fibres having a core with a thermoplastic outer layer. The first fibre component 102 may e.g. be grinded or shredded glasswool, preferably from recycled ceiling tiles that are grinded or shredded to form the first fibre component 102. The method 1000 may thus comprise grinding or shredding recycled ceiling tiles for forming the fibre component 102.

The second fibre component 104 is as mentioned bicomponent fibres. The bicomponent fibres have a core provided with a thermoplastic outer layer. The thermoplastic outer layer may be polyethylene, however other materials are also considered. The thermoplastic outer layer of the bicomponent fibres may thus form a binder that facilitates subsequent fixation of the two fibre components 1002, 104. Furthermore, a separate binder may be provided for fixation of the first and second fibre components 102, 104.

The first and second fibre components 102, 104 may further be provided in different proportions, i.e. different mixing ratios, which provides different acoustic properties to the acoustical elements 100.

The method 1000 further comprises mixing 1004 the first fibre component and the second fibre component 102, 104, for provision of a mixture 1. The mixing 1004 may be performed by forming a homogenous mixture 1 in which the first fibre component 102 and the second fibre component 104 are evenly distributed in the mixture 1. The mixing 1004 may be controlled such that the mixing ratio for a single acoustical element 100 is non-uniform. I.e. such that one region 116, 118 (shown in FIG. 5) of the acoustical element 100 is provided with predominantly the first fibre component 102 while another region 116, 118 of the acoustical element is provided with predominantly the second fibre component 104. As such, one single acoustical element 100 can be provided with differing acoustic properties over the surface thereof by varying the proportions of the first fibre component 102 and the second fibre component 104.

The mixture 1 is then shaped 1006 into single layered tile shaped elements 2 whereby the mixture 1 is compressed with a compression ratio to a compressed state. The compression ratio may be controlled such that the compression ratio for a single acoustical element 100 is non-uniform. Increasing the compression ratio in a region of the acoustical element 100 provides increased airflow resistance and thus reduced sound absorbing qualities for that region, and thus increased sound reflection and possibly diffusion. Reducing the compression ratio in a region oppositely provides improved sound absorbing qualities for that region.

The shaping 1006 is preferably performed by means of a form pressing operation such as by means of vacuum forming, drape forming or pressure forming. Form pressing allows local variations of e.g. the thickness of the acoustical element 100 as well as the density/compression ratio thereof. I.e. such that different regions of the acoustical element 100 may have different thickness, topography and/or density/compression ratio, all of which allows providing different acoustical properties to different regions of the acoustical element 100.

Moreover, the shaping 1006 may comprise a calendaring operation 1006a in which the mixture 1 that is to form the single layered tile shaped element 2 and the acoustical element 100 is brought through calendaring rolls. The calendaring rolls may be smooth or provided with protruding patterns such that regions of the mixture 1 that is to form the acoustical element 100 receives a higher compression ratio than surrounding regions.

The method 1000 further comprises fixating 1008 the single layered tile shaped elements 2 in the compressed state for obtaining the acoustical elements 100. The fixation 1008 of the single layered tile shaped elements 2 may be performed simultaneously as the shaping 1006, e.g. during the form pressing operation, or as a separate subsequent manufacturing step. The fixating 1008 of the single layered tile shaped elements 2 comprises heating 1008a the single layered tile shaped elements 2 in the compressed state for melting the thermoplastic outer layer of the bicomponent fibres and, additionally, for activating a separate binder. The second fibre component 104 and/or the binder is thus activated for fixating 1008 the single layered tile shaped elements 2 in the compressed state for obtaining the acoustical element 100. The first and second fibre components 102, 104 are consequently fixated 1008 in the desired shape of the acoustical element 100.

The mixing 1004 the first fibre component 102 and the second fibre component 104 and shaping 1006 the mixture comprises controlling a mixing ratio of the first fibre component 102 in relation to the second fibre component 104 and/or the compression ratio of the mixture such that the acoustical elements 100 comprises a first group of the acoustical elements 100 having a first set of acoustic properties, such as sound absorbing properties, and a second group of the acoustical elements 100 having a second set of acoustic properties being different from the first set of acoustical properties.

As will be elaborated further on below, the method 1000 allows many variations of the acoustical elements 100 such that the manufacturing method 1000 allows provision of a series of acoustical elements 100 that are all tailored to suit their respective intended position and function in a room.

The method may further comprise arranging 1010a core elements 10 in the mixture before the step of shaping 1006 of the mixture and removing 1010b the core elements 10 from the mixture after the step of fixation 1008 of the mixture for formation of at least one cavity 106 in the acoustical element. This is illustrated in FIG. 1, in which four core elements 10 provided to form four corresponding cavities 106 in an acoustical element 100.

The core elements 10 are arranged 1010a into their intended positions in the acoustical element 100 when it is still in the shape of a mixture 1 that is about to be shaped 1006 and fixated 1008 into its final shape as an acoustical element 100. The core elements 10 are illustrated as cylindrical core elements 10, but they could be realized with other shapes as well. For instance, the core elements 10 may be conically shaped, cubiod or pyramidal. However, as the core elements 10 preferably should be removable from the acoustical element 100 as the acoustical element 100 has been fixated 1008, the core elements 10 must be arranged such that they can be accessed from one of the sides of the acoustical element 100 once it is fixated 1008. It is however feasible that the core elements 10 may be configured to remain in the acoustical element 100 and thus not have to be removed therefrom, which would provide less constraints on how the core elements 10 has to be formed. For instance, the core elements 10 could in such an embodiment naturally be fully enclosed in the acoustical element 100 and thus not have to be accessible from any of the sides of the acoustical element 100 for removal.

When the core elements 10 are arranged in their respective intended position, the mixture 1 can be shaped 1006 and fixated 1008 into an acoustical element 100.

The core elements 10 are, if desired, subsequently removed 1010b after the single layered tile shaped element 2 is fixated 1008 into an acoustical element 100 and thus maintains its shape. The core elements 10 may thus generate cavities 106 in the acoustical element 100 that corresponds to the shape of the core elements 10. Each cavity 106 provides acoustic properties to the acoustical element 100, as each cavity 106 may alter the airflow resistance through the acoustical element 100 and/or resonance properties throughout the fibre structure. The cavities 106 may thus improve the sound absorption of the acoustical element 100 locally where the cavities 106 are arranged.

The cavities 106, which may be formed by the core elements 10, are shown being evenly distributed throughout the acoustical element 100. The core elements may thus be arranged for formation of a plurality of evenly distributed cavities 106 in each acoustical element 100. However, the core elements 10 may be arranged 1010a unevenly distributed in the mixture 1 as well. For instance, it may be desired to provide an acoustical element 100 that gradually transitions from mainly reflecting sound waves to mainly absorbing sound waves or vice versa. In such an application, the arrangement 1010a of core elements 10 can be performed accordingly such that more core elements 10/cavities 106 are arranged in the region of the acoustical element 100 in which high sound absorption is desired and vice versa.

The method may be carried out in a piece-by-piece operation or in a line-based operation. The line-based operation may comprise one or more production lines. For instance, a first production line may be utilized for making acoustical elements with a first set of acoustic properties and a second production line may be utilized for making acoustic elements with a second set of acoustic properties.

In the following, the method 1000 illustrated in FIG. 1 will be further explained in relation to a number of different embodiments of finished acoustical elements 100. It is to be realized that while some embodiments are separately illustrated and described, the various embodiments can be freely combined into a single acoustical element 100.

Figure 2:
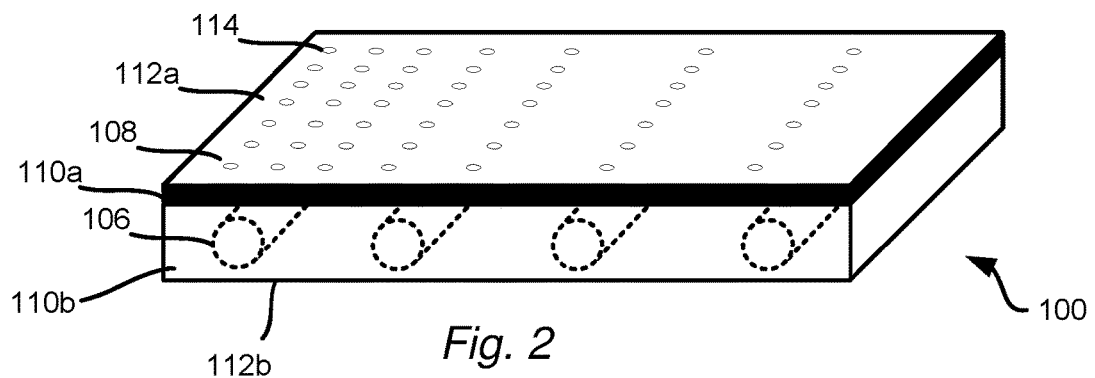
FIG. 2 discloses a perspective view of an acoustical element manufactured according to the method disclosed herein.

FIG. 2 shows a perspective view of an acoustical element 100 in which the acoustical element is provided 1012 with a surface layer 108. As is shown, the surface layer 108 may be provided 1012 on a front surface 112a of the acoustical element 100. The front surface 112a is the surface intended to face the room in which the acoustical element 100 is mounted. However, a surface layer 108 may be provided 1012 also to an opposite rear surface 112b of the acoustical element 100.

The provision 1012 of the surface layer 108 may be performed before the shaping 1006 of the mixture 1, as is illustrated in FIG. 1, such that that the surface layer 108 is integrated into the acoustical element 100 during the shaping 1006 and fixation 1008 of the mixture 1. However, the surface layer 108 could also be applied after the shaping 1006 or after the fixation 1008.

Figure 4:
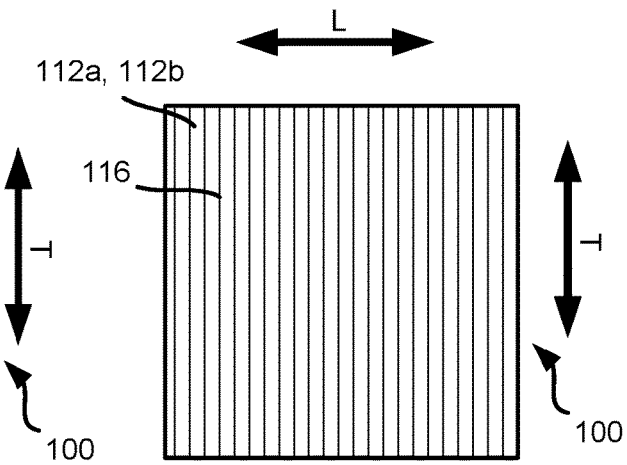
FIG. 4 discloses an acoustical element manufactured according to the method disclosed herein.

The surface layer 108 may be provided with perforations 114 as is shown in FIG. 2. The perforations 114 may be uniformly distributed over the surface layer 108 or, as is illustrated in FIG. 4, be distributed in a non-uniform manner. This is one way to achieve a non-uniform air-flow resistance through the surface layer 108 which will follow the distribution of the perforations 114. In a region of the acoustical element 100 in which there are many perforations 114, less air-flow resistance is generated, and thus improved sound absorption compared to a region having less perforations 114.

Moreover, the method 1000 may perform the steps of providing 1002 a first fibre component 102 in the form of mineral wool and a second fibre component 104 and mixing 1004 the first fibre component 102 and the second fibre component 104 for provision of a mixture 1 twice such that separate layers 110a, 110b are formed in the acoustical element 100. Each layer 110a, 110b may be provided with different mixing ratios of the first fibre component 102 and the second fibre component 104.

Figure 3:
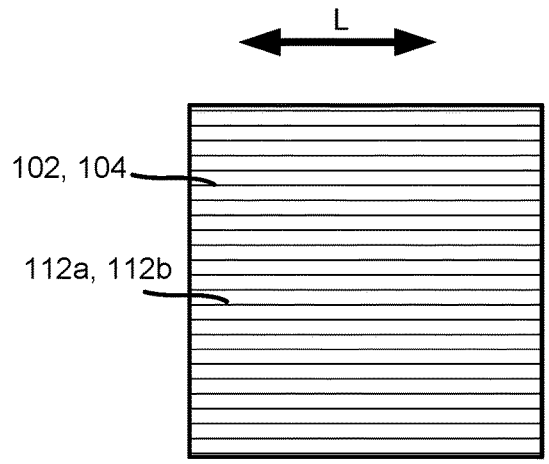
FIG. 3 discloses an acoustical element manufactured according to the method disclosed herein.

FIG. 3 schematically shows an acoustical element 100 according to one embodiment. In FIG. 3, the first and second fibre components 102, 104 in the mixture are shaped 1006 such that the main fibre direction is in the longitudinal direction L of the acoustical element 100. The longitudinal direction L is herein defined as a direction being parallel with a main extension plane of the element 100. The shaping 1006 may thus comprise a step of directionally arranging the first and second fibres 102, 104 in a desired direction.

One example of how this may be achieved is by treating the mixture with a rotating spiked mandrel.

FIG. 3 illustrates the main general direction in which the fibres of the first and second fibre components 102, 104 are to be arranged and is thus simplified, it is to be understood that individual fibres may deviate from the main direction.

FIG. 4 similarly to FIG. 3 schematically shows an acoustical element 100 according to another embodiment in which the main fibre direction of the first and second fibre components 102, 104 are arranged in a transverse direction T which is essentially perpendicular in relation to the longitudinal direction L and extends in the thickness direction of the element.

The fibre length of the first and second fibre component may be configured to be smaller than an intended thickness of the acoustical element, whereby the fibres are free to be arranged in any direction. For example, the fibres may be oriented in the T-direction by forming the mixture into a web which is moved slower than an infeed rate of the fibre mixture, resulting in a packing of the mixture which orientates the fibres in the desired transverse direction T.

Figure 5:
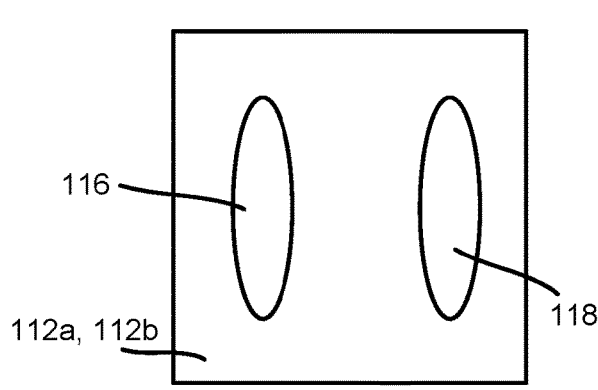
FIG. 5 discloses an acoustical element manufactured according to the method disclosed herein.

FIG. 5 shows an acoustical element 100 in which the method 1000 comprises controlling the mixing ratio such that the mixing ratio for a single acoustical element 100 is non-uniform. As such, a first region 116 may be achieved in which the first fibre component 102 is present in higher or lower proportion in relation to the second fibre component 104 than it is in the remaining acoustical element 100. Any number of such regions 116 may be provided, each exhibiting different acoustical properties depending on the controlled mixing ratio for each first region 116.

Moreover, the method 1000 may comprise controlling the compression ratio such that the compression ratio for a single acoustical element 100 is non uniform. In FIG. 5, the acoustical element 100 is provided with a second region 118 in which the compression ratio of the mixture may be higher or lower than the remaining acoustical element 100. Increasing the compression ratio increases the airflow resistance and thus reduces the sound absorption. Each acoustical element 100 can thus be manufactured by the method 1000 with tailored acoustic properties. Any number of such regions 118 may be provided, each exhibiting different acoustical properties depending on the controlled compression ratio for each second region 118.

Figure 6:
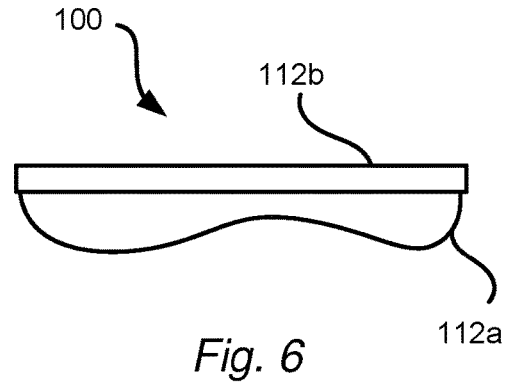
FIG. 6 discloses a side view of an acoustical element manufactured according to the method disclosed herein.

FIG. 6 further discloses an acoustical element 100 which is manufactured by means of the method 1000 such that it has a non-uniform thickness. The step of shaping 1006 the mixture may thus comprise forming single layered tile shaped elements, acoustical elements 100, with non-uniform thickness, such that the acoustical elements obtain a front and/or rear surface provided with a topography, i.e. a non planar surface. The shaping 1006 may be controlled to achieve the desired thickness by means of using a corresponding mould 3 (shown in FIG. 1) into which the mixture 1 is arranged for shaping 1006 and fixating 1008. Variations in thickness of the acoustical element 100 affects the sound absorbtion properties of the acoustical element 100, for instance will an increased thickness for most materials provide improved absorption for lower sound frequencies while the opposite is true for a reduced thickness.

Figure 7:
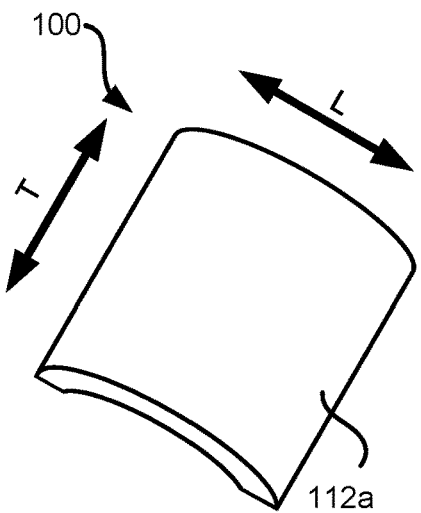
FIG. 7 discloses a perspective view of an acoustical element manufactured according to the method disclosed herein.

FIG. 7 shows a perspective view of an acoustical element 100 for which the shaping 1006 of the mixture into single layered tile shaped elements 2, to form acoustical elements 100, is performed such that the single layered tile shaped elements 2 are provided with a single curved or double curved extension which is then fixated 1008 into corresponding acoustical elements 100. The acoustical element 100 shown is provided with a single curved extension, the curvature may be arranged in the longitudinal direction L or in the transverse direction T of the room in which the acoustical element 100 is mounted. A double curved extension is however equally possible in which the curvature is in both the longitudinal and transverse directions L, T. The convex curvature of the front surface 112a of the acoustical element 100 facilitates diffusion of sound.

Figure 8:
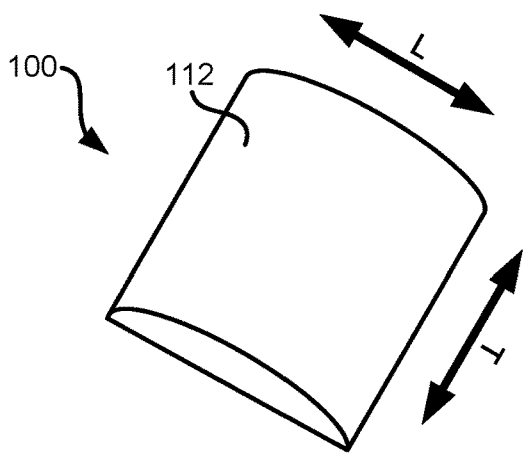
FIG. 8 discloses a perspective view of an acoustical element manufactured according to the method disclosed herein.

FIG. 8 shows an acoustical element 100 for which the method 1000 comprises shaping 1006 of the mixture 1 into single layered tile shaped elements 2 such that the single layered tile shaped elements 2 obtain a front surface 112a and/or rear surface 112b provided with a single curved or double curved topography. The single layered tile shaped elements 2 are fixated 1008 to form corresponding acoustical elements 100. The acoustical element 100 shown is provided with a single curved topography, the curvature may be arranged in the longitudinal direction L or in the transverse direction T of the room in which the acoustical element 100 is mounted. A double curved topography is however equally possible in which the curvature is in both the longitudinal and transverse directions L, T. The convex curvature of the front surface 112*a* of the acoustical element 100 facilitates diffusion of sound FIG. 9 further shows a suspended ceiling system 200 comprising ceiling tiles in the form of acoustical elements 100 manufactured by the method 1000 according to the teachings herein, the ceiling tiles are obtained from the first and second groups 100*a*, 100*b*, 100*c* with mutually different acoustic properties. The suspended ceiling system 200 may be suspended by means of a grid of profiles or in other ways as is realized by one skilled in the art.

For a suspended ceiling system 200 to provide acoustic properties that facilitates transmission of speech, such as in an auditorium or in a conference room or similar, it is typically desired that some sound waves are reflected back towards the speaker while others are reflected towards the audience. The sound waves reflected back towards the speaker should provide early reflections, i.e. be reflected back within 30 ms to 50 ms from when they are generated. Such early reflections should also be provided to the audience. Early reflections generally improve both speaker comfort and speech intelligibility. Reflections and reverberations which occurs later than 30 ms to 50 ms are however considered detrimental and should thus be reduced.

Figure 9:
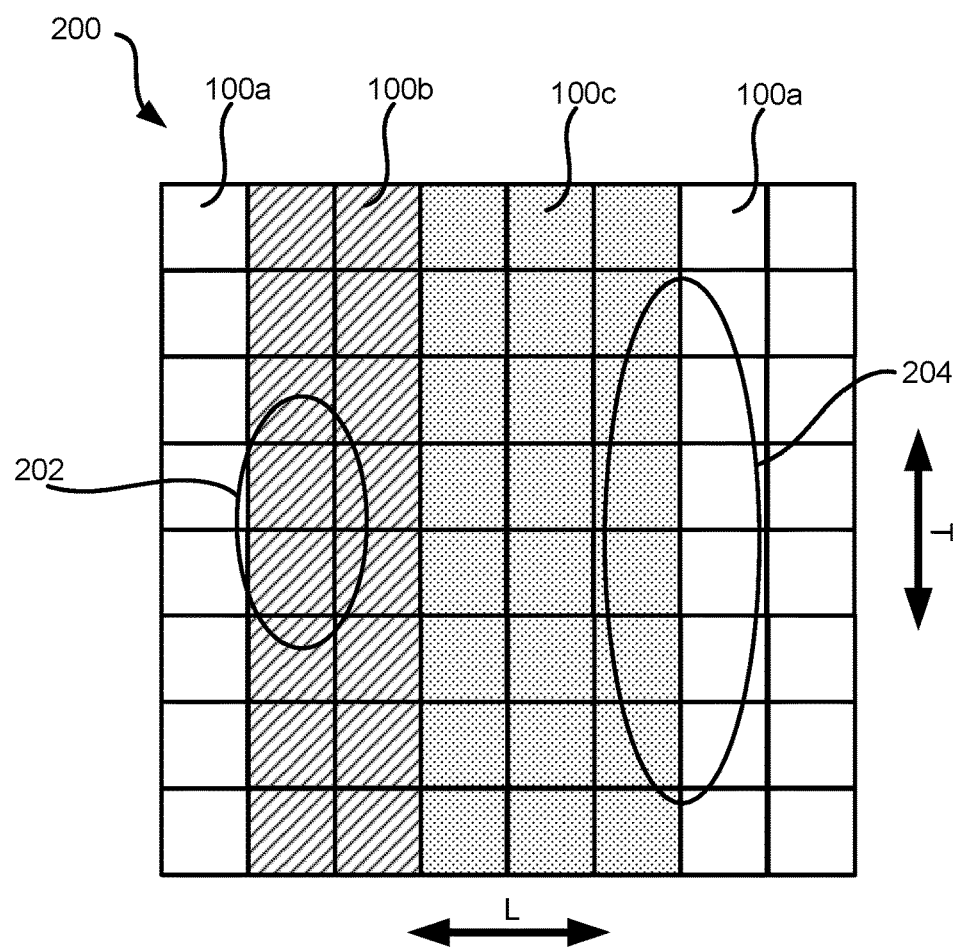
FIG. 9 discloses a suspended ceiling system comprising ceiling tiles in the form of acoustical elements obtained from a first group of acoustical elements and a second group of acoustical elements having different acoustic properties.

In such a context, the suspended ceiling system 200 may be provided with ceiling tiles in the form of acoustical elements 100 from a first group 100*a* which comprises acoustical elements 100 having high sound absorption. These may, as is illustrated in FIG. 9, be arranged behind a speaker position 202 and also towards the rear of the suspended ceiling system 200 behind an audience position 204. This first group 100*a* of ceiling tiles 100 will thus prevent sound reflections where it is not desired, i.e. from behind the speaker position 202 and behind the audience position 204. The acoustical elements 100 in the first group 100*a* may thus be manufactured according to the method 1000 disclosed herein with a reduced compression ratio and/or be provided with cavities etc. to achieve high sound absorption.

Moreover, ceiling tiles in form of acoustical elements 100 in a second group 100*b* may be arranged above and slightly in front of the speaker position 202. In this region of the suspended ceiling system 200, it is desired to provide reflection and diffusion of sound. Preferably such that sound reaches both the speaker position 202 and the audience position 204. As such, the acoustical elements 100 in the second group 100*b* may be manufactured according to the method 1000 with an extension and/or topography that is single curved or double curved as is shown in FIGS. 7 and 8. The curvature of the front surface 112*a* of the acoustical elements in the second group 100*b* arranged in the longitudinal direction L of the room facilitates sound diffusion and directionality as described above.

The suspended ceiling system 200 may further be provided with a third group 100*c* of acoustical elements 100, which are arranged between the speaker position 202 and at least partially above the audience position 204. The third group 100*c* being arranged farther away from the speaker position 202 than the second group 100*b*. In this region of the suspended ceiling system 200, reflections that are directed back to the speaker position 202 may be undesired as they would be detrimental to speaker comfort. As such, the acoustical elements 100 of the third group 100*c* may be provided with acoustical properties that facilitates reflection but not wide angle diffusion of sound. The sound will thus only be reflected towards the audience position 204 and not back to the speaker position 202. Such acoustical elements 100*c* of the third group could be manufactured by the method 1000 herein by for instance shaping 1006 the mixture 1 such that is essentially flat but with a relatively high compression ratio, to name one example.

It is to be realized that FIG. 9 illustrates but one example of a suspended ceiling system 200, many variations are possible within the scope of the present disclosure. For instance, any number of different groups 100*a*, 100*b*, 100*c* may be provided depending on the application. Manufacturing acoustical elements 100 according to the method 1000 described above allows each suspended ceiling system 200 to be delivered tailored to the intended use, while reducing the environmental impact as recycled fibre materials are used at least in the first fibre component 102.

It will be appreciated that the present invention is not limited to the embodiments shown. Several modifications and variations are thus conceivable within the scope of the invention which thus is exclusively defined by the appended claims.

The invention claimed is:

1. A method for manufacturing acoustical elements, comprising:
   providing a first fibre component in a form of mineral wool and a second fibre component in a form of bicomponent fibres having a core with a thermoplastic outer layer;
   mixing the first fibre component and the second fibre component to provide a mixture;
   shaping the mixture into a group of single layered tile shaped elements whereby the mixture is compressed with a compression ratio to a compressed state; and
   fixating the group of single layered tile shaped elements in the compressed state for obtaining the acoustical elements, wherein
   fixating the group of single layered tile shaped elements comprises heating the group of single layered tile shaped element in the compressed state for melting the thermoplastic outer layer of the bicomponent fibres, whereby the second fibre component is activated for fixating the group of single layered tile shaped elements in the compressed state,
   mixing the first fibre component and the second fibre component and shaping the mixture comprises controlling a mixing ratio of the first fibre component in relation to at least one of the second fibre component and the compression ratio of the mixture for providing a first group of the acoustical elements having a first set of acoustic properties and a second group of the acoustical elements having a second set of acoustic properties being different from the first set of acoustical properties, and
   the compression ratio is further controlled such that the compression ratio for a single acoustical element of the acoustical elements is non-uniform.

2. The method for manufacturing acoustical elements according to claim 1, wherein shaping the mixture further comprises forming the group of single layered tile shaped elements in a form pressing operation.

3. The method for manufacturing acoustical elements according to claim 1, wherein shaping the mixture further comprises forming the single layered tile shaped elements in a form pressing operation.

4. The method for manufacturing acoustical elements according to claim 1, wherein the mixing ratio is further controlled such that a mixing ratio for a single acoustical element of the group of single layered tile shaped elements of the acoustical elements is non-uniform.

5. The method for manufacturing acoustical elements according to claim 1, wherein shaping the mixture further comprises forming the single layered tile shaped elements of the acoustical elements with a non-uniform thickness.

6. The method for manufacturing acoustical elements according to claim 1, further comprising arranging core elements in the mixture before shaping of the mixture, and removing the core elements from the single layered tile shaped elements of the acoustical elements after fixation of the group of single layered tile shaped elements to form cavities in the acoustical elements.

7. The method for manufacturing acoustical elements according to claim 6, wherein the core elements are arranged to form a plurality of evenly distributed cavities in each acoustical element of the acoustical elements.

8. The method for manufacturing acoustical elements according to claim 1, wherein the shaping of the mixture into single layered tile shaped elements is performed such that the tile shaped elements are provided with a single curved or double curved extension.

9. The method for manufacturing acoustical elements according to claim 1, wherein the shaping of the mixture into the group of single layered tile shaped elements is performed such that the single layered tile shaped elements obtain at least one of a front surface and a rear surface provided with at least one single curved or double curved topography.

10. The method for manufacturing acoustical elements according to claim 1, further comprising providing each acoustical element of the acoustical elements with a surface layer forming at least one of a front and back layer thereof.

11. The method for manufacturing acoustical elements according to claim 10, wherein the surface layer has non-uniform air flow resistance.

\* \* \* \* \*